United States Patent [19]
Peters et al.

[11] Patent Number: 6,063,134
[45] Date of Patent: May 16, 2000

[54] METHOD TO PROVIDE A SOFTWARE PACKAGE AND A PROVIDER STATION AND A USER STATION REALIZING THE METHOD AND A BASIS SOFTWARE PACKAGE

[75] Inventors: Laurent Marie L. Peters, Hennuyère; Johan Peeters, Kessel-Lo; Philippe François Marie Octave Ghislain Swinnen; Vincent Christophe Marc Marie Gheur, both of Brussels, all of Belgium

[73] Assignee: Alcatel, Paris, France

[21] Appl. No.: 09/035,209

[22] Filed: Mar. 5, 1998

[30] Foreign Application Priority Data

Mar. 14, 1997 [EP] European Pat. Off. .............. 97400575

[51] Int. Cl.[7] ................................ G06F 9/445; H04L 9/00
[52] U.S. Cl. ........................... 717/11; 717/5; 30/4; 30/25; 705/26; 713/200
[58] Field of Search ..................................... 395/712, 705; 380/4, 25, 49; 705/26, 27; 713/200

[56] References Cited

U.S. PATENT DOCUMENTS

| | | | |
|---|---|---|---|
| 5,222,134 | 6/1993 | Waite et al. | 380/4 |
| 5,509,074 | 4/1996 | Choudhury et al. | 380/23 |
| 5,826,088 | 10/1998 | Sitbon et al. | 395/705 |
| 5,870,543 | 5/1999 | Ronning | 713/200 |
| 5,903,647 | 5/1999 | Ronning | 390/4 |
| 5,907,617 | 5/1999 | Ronning | 380/4 |

OTHER PUBLICATIONS

"Alcatel 1303 NM–Expert, Integrated and Intelligent Solutions for Network, System and Service Management", Alcatel Product Brochure P–M–E–75005, Alcatel Bell, Belgium, 1995.

"A Chosen–Plaintext Attack on the Microsoft BASIC Protection", R. van den Assem et al, *Computers& Security,* vol. 5, No. 1, Mar. 1986, pp. 36–45.

"QuickBASIC 4.0", G. Vose, *BYTE,* vol. 12, No. 13, Nov. 1987, pp. 111–112, 114.

"Software schutzt Software Programm–Blockade und Selbstzer–storung", H–G. Joepgen, *Elektronik,* vol. 39, no. 17, Aug. 17, 1990, pp. 72–76.

"John Sanguinetti on: Circuit Model Security", J. Sanguinetti, *Computer Design,* vol. 33, No. 1, Jan. 1994, pp. 119–120.

"Secure Source Data Transport in a Three Party System", *IBM Technical Disclosure Bulletin* vol. 37, No. 048, Apr. 1994, pp. 623–625.

*Primary Examiner*—Tariq R. Hafiz
*Assistant Examiner*—Tuan Q. Dam

[57] ABSTRACT

The method is used to provide a software package for installation in a user station (US) without revealing the contents of the software package. The method includes the steps of encoding a readable source version (PACK.SOURCE) of the software package following a predefined encoding algorithm thereby generating an encoded software package (PACK.ENC) and delivering the encoded software package (PACK.ENC) from a provider station (PS) to the user station. In order to install the encoded software package (PACK.ENC) at the user station (US) the method further includes the step of providing, either together with the encoded software package (PACK.ENC) or separately, a basis software package (BASIS) for combined decoding and compiling of the encoded software package (PACK.ENC). The basis software package (BASIS) includes software to perform the combined decoding and compiling thereby generating a compiled software package (PACK.COMP).

9 Claims, 1 Drawing Sheet

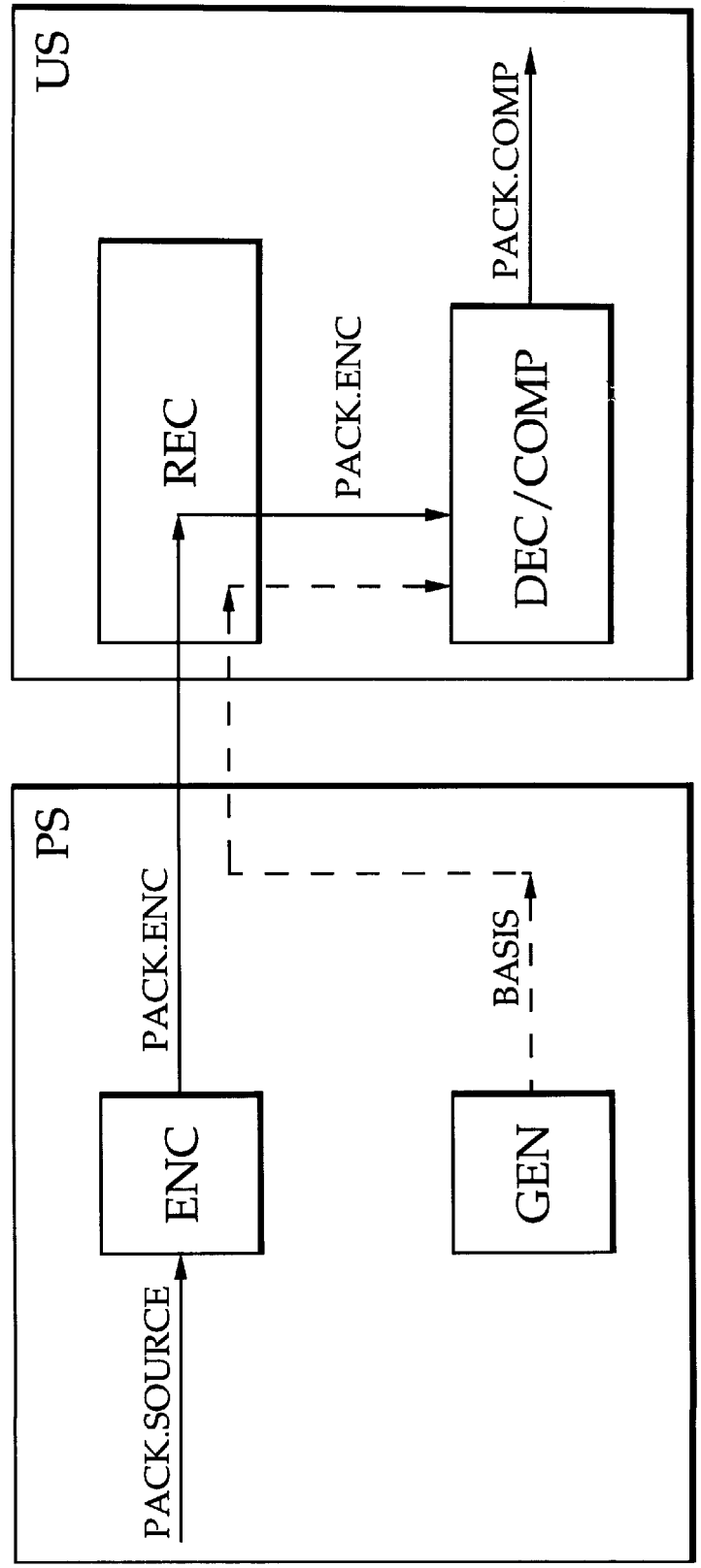

METHOD TO PROVIDE A SOFTWARE PACKAGE AND A PROVIDER STATION AND A USER STATION REALIZING THE METHOD AND A BASIS SOFTWARE PACKAGE

BACKGROUND OF THE INVENTION

1. Technical Field

The present invention relates to a method to provide a software package and a provider station and a user station realizing the method and a basis software package used in the method.

2. Discussion of Related Art

Such a software packet is for instance a software package as described in the product description 'NM Expert:Integrated and Intelligent Solutions for Network, Systems and Service Management, Alcatel 1303, NM-Expert Product Description P-M-E-75005' from Alcatel Bell, Belgium and published in 1995. Therein, a modern network management system is described. This network management system is a software package for building integrated and Intelligent Network Management Systems for most demanding networking requirements and for most stringent customer specifications. The software package is delivered to customers having different kinds of hardware platforms e.g. RISC machines of SUN Microsystems, Hewlett Packard machines or IBM machines and different kinds of software platforms e.g. SUN Operating System, Solaris, and Hewlett Packard—UX.

A well known way to provide such kind of software package as described above from a provider to a user is for instance delivery on e.g. a tape of a compiled software package to a user station of the user. An advantage of such a method to provide a software package for installation in a user station is that the contents of the software package are not revealed to the user since a compiled version of a software package is not a human readable version.

However compiling of such a software package has to be done in the same environment as the user's environment. Indeed, a user which is using a particular hardware and software platform is using a particular compiler. In order to deliver a compiled software package, the precise user's environment has to be reconstructed at the provider's side whereby the compiled software package is generated in the same environment as the environment wherein the software package is used. Since not all users are working with the same hardware and software platform, reconstructing an environment implicates knowing for each user e.g. the hardware platform, the operating system, the kind of compiler and the compiler version, the version of the delivered software package and the delivery of prior patches of the software package.

SUMMARY OF THE INVENTION

An object of the present invention is to provide a method to provide a software packet for installation in a user station without revealing the contents of the software package but which doesn't have the above drawback of needing to reconstruct a precise user's environment at the provider's side for each different user.

According to a first aspect of the invention, a method to provide a software package for installation in a user station without revealing the contents of said software package, is characterized in that said method includes the steps of encoding a readable source version of said software package following a predefined encoding algorithm thereby generating an encoded software package, and delivering said encoded software package to said user station.

According to a second aspect of the invention, a provider station to provide a software package to a user station for installation without revealing the contents of said software package, is characterized in that said provider station includes encoding means to encode a readable source version of said software package following a predefined encoding algorithm in order to generate thereby an encoded software package and to provide said encoded software package to an output of said provider station in order to deliver said encoded software package from said provider station to said user station.

Indeed, by omitting the step of compiling at the provider station, a reconstruction of a precise user environment at the provider's side for each different user is not necessary. The problem of knowing the kind of compiler and the version of the compiler does not occur anymore and the environment is always the same as the environment wherein the compilation has taken place. However to keep the advantage of not revealing contents of the software package, a readable source version of the software package is encoded following a predefined encoding algorithm whereby an encoded software package is generated and delivered to the user station. Indeed, since the source version of a software package is often considered as a trade secret e.g. like the software package NM-Expert as described above which is a trademark of Bell Telephone Manufacturing Company N.V., it is important to ensure that the source version of the software package is not human readable.

It has to be remarked that the method of the invention is also applicable to later on delivered patches.

An important advantage by using the method following the invention is that the delivery of an encoded readable source version of a software package is significantly less bulky than delivery of a compiled software package.

Once an encoded software package has been delivered to a user station, a straight forward way to use the delivered encoded software package, is to decode the encoded software package and to compile the decoded software package. An additional decoding software package has to be delivered to the user to decode the encoded software package following a predefined decoding algorithm according to the predefined encoding algorithm. This delivery is performed either together or separately with the first delivered software package.

However, in order to keep the requirement of not revealing the contents of the software package during installation time at the user's side, an additional characteristic feature is that the additional decoding software package is an adapted decoding software package, called in the claims and hereafter a basis software package, which includes software to perform combined decoding and compiling of the encoded software package. Following the combined decoding and compiling, a compiled package is generated without generating a readabl, source version of the software package which means that the output of the decoding is seamlessly passed to the input of the compiler. Since no source version of the software package is generated, prevention of interception of a source version of the software package is realized. In further accord with the second aspect of the invention, a provider station is characterized in that said provider station further includes generating means to generate a basis software package and to provide said basis software package to an output of said provider station in order to deliver said basis software package to said user station, said basis software package including software to perform combined decoding and compiling of said encoded software package and to generate a compiled software package.

According to a third aspect of the invention, a user station to install a software package, delivered to said user station as an encoded software package, originated in a provider station and encoded to avoid revealing the contents of said software package, is characterized in that said user station includes receiving means to receive said encoded software package and combined decoding and compiling means to perform combined decoding and compiling of said encoded software package and to generate a compiled software package, said combined decoding and compiling being performed following software included in a basis software package either delivered by said provider station to said user station together with said encoded software package or separately.

According to a fourth aspect of the invention, a basis software package is characterized in that said basis software package includes software to perform combined decoding and compiling of an encoded software package which is generated while encoding a readable version of a software package following a predefined encoding algorithm.

Furthermore, it has to be remarked that following the method of the previous paragraph a compiled software package is generated whereby this compiled software package can be loaded and further used by the user. It has to be remarked that the step of loading the compiled software package can be started e.g. manually or automatically after performing of the combined decoding and compiling step. During the combined decoding and compiling a translation of a language understandable to a programmer into instructions understandable to a computer i.e. machine language is performed. However an alternative internal arrangement of the installation operation is possible. In such a case, a basis software package is provided for combined decoding and compiling the encoded software package which includes software to perform combined decoding and compiling of the encoded software package following the interpreted mode. Thus, the encoded software package does not have to be necessarily brought into a compiled version before being loaded but a delivered encoded software package can in a combined way be decoded, compiled and loaded following an interpreted mode. In this way an encoded software package is in a combined way decoded, compiled i.e. translated into machine language and immediately executed since the performance of a desired operation is enabled.

A possible way to perform a combined decoding and compiling is that the combined decoding and compiling includes separately decoding and compiling of separate parts of the encoded software package which makes it even more difficult to possible infringers to get access to the total readable source version of the software package.

A basis software packet which includes software to perform combined decoding and compiling of an encoded software package which is generated while encoding a readable version of a software package following a predefined encoding algorithm. Thus, the decoding part performed during the combined decoding and compiling is performed following a predefined decoding algorithm according to the predefined encoding algorithm. It has to be remarked that different decoding algorithms can be used. The type of algorithm chosen can be made dependent upon expected investment a possible attacker is willing to do.

A further remark is that other modules can be included in the encoding and decoding techniques. An important example hereof is the use of compression and decompression techniques at the provider's side and the user's side, respectively. Indeed, compression is an interesting option when the capacity of a physical distribution medium e.g. floppy disks is limited in comparison with the volume of the software package to be delivered to the user. Taken the above advantage of the method of the invention and combining the method of the invention with a compression technique, an important reduction of volume of the delivered software package i.e. the encoded software package is achieved. Moreover, since decompression is integrated in the decoding technique, it happens transparently for the user.

Finally, in order to give an extra protection to the combined way of decoding and compiling i.e. to prevent interception of a source version of the software package, one or more security conditions are included in the basis software package in order to be controlled while using the basis software package in order to install the delivered encoded software package. Upon checking of one of the security conditions and in the event when this security condition is not fulfilled the combined decoding and compiling is not further executed or the encoded software package is destroyed. Indeed, by including a security condition and e.g. also a destroying technique, a possible attacker is discouraged. Even if he breaks the encoding technique his gains are limited since the destroying technique makes the encoded software package unreadable by a variety of means i.e. the destroying techniques makes the encoded software package useless by replacing the contents or parts of the contents of the encoded software package with meaningless data.

Yet, a pollution technique can be included in the encoding algorithm on the provider's side. A pollution technique is a technique aimed at further discouraging a possible attacker by ensuring that, even if he or she manages to break the encoding algorithm the gains are limited. Indeed, a polluted encoded software package which has been decoded to a source version of the software package has been rendered unreadable to a human being by a variety of means which may include e.g.:

calls to macro's which at compilation time expand to nothing; or removed and added white space without semantics; or removed comments.

Another example of what can be included in the decoding technique used by the method of the invention is that the decoder interacts with a licence manager prior to the step of combined decoding and compiling of the delivered encoded software package. The interaction with a licence manager provides the possibility to check if a particular user is entitled to have access to all delivered functionality or to only predefined parts of the delivered functionality or to no functionality at all.

Yet, another example of what can be included in the decoding technique used by the method of the invention is that the decoder includes a pay per use scheme. This pay per use scheme is interesting for certain types of software packages like e.g. games. Indeed, by including in the basis software packgage a pay per use scheme, tracking of the number of times that the basis software package is used is made possible e.g. each time the source package is accessed a predefined variable is incremented. It has to be remarked that the profit of including this additional feature becomes clear in the event that the encoded software package is loaded following the combined step of decoding, compiling and executing following the interpreted mode. In the event that the encoded software package is first returned in a compiled software package before loading and executing the compiled software package, the source software package is only once accessed which is at the time of providing during the combined step of decoding and compiling the compiled software package. In this case, the pay per use scheme is copied from the source software package to the compiled software package during this single access whereby tracking of the number of times that the compiled software package is used is made possible.

As already mentioned in the previous paragraph, the present invention is not restricted to software packages such as the above software package for network management, and it will be evident to a person skilled in the art that other kinds of software packages can also be delivered following the method of the invention such as any kind of commercial software e.g. software games.

It also has to be remarked that although the term "package" in the expression software package is used, it has to be understood that such a software package may include one or more software files or even parts of a software file.

Still a remark further is that although in the above introductory part, in the claims and in the further description of a preferred embodiment, the term "delivered" is used, it is obvious to a person skilled in the art that the present invention is not restricted to deliveries of an encoded software package on a physical carrier e.g. diskette, but that also deliveries of an encoded software package over a network via physical links of e.g., twisted pairs coax cable or optical fiber or even deliveries via a wireless network such as a mobile network may be used without limiting the scope of the invention.

It is further noticed that the term "including", used in the claims, should not be interpreted as being limiting to the means listed thereafter. Thus, the scope of the expression "a device including means A and means B" should not be limited to devices including only components A and B. It means that with respect to the present invention, the only relevant components of the device are means A and means B.

BRIEF DESCRIPTION OF THE DRAWING

The above mentioned and other objects and features of the invention will become more apparent and the invention itself will be best understood by referring to the following description of a preferred embodiment taken in conjunction with the accompanying sole FIGURE of the drawing which shows a schematic block diagram of a provider station and a user station which are working following the method of the invention.

DETAILED DESCRIPTION OF PREFERRED EMBODIMENT

Referring to the sole FIGURE the working of the preferred embodiment will be explained by means of a functional description of the blocks shown therein. Based on this description, implementation of the functional blocks will be evident to a person skilled in the art and will therefor not be described in further detail. In addition, the principle working of the preferred embodiment regarding the invention will be described in further detail.

The object of the preferred embodiment following the invention is to provide a software package for installation in a user station without revealing the contents of the software package, i.e., the source code. The software package is provided from the provider station PS of a provider to the user station US of the user via a physical carrier or medium. The physical carrier indicated is indicated in the FIGURE by a solid line, but the delivery of the software package is also indicated by this solid line.

The chosen software package (not shown in the FIGURE) is a software package for building integrated and intelligent network management systems. The software package is developed in LISP, a programming language commonly used for artificial intelligence applications. Peripheral tasks such as communication with network devices, interoperation with foreign applications e.g. databases and the operator interface are implemented in C and C++.

The provider station PS includes encoding means ENC and generating means GEN.

The encoder means ENC are included to encode a readable source code version of the software package PACK.SOURCE, provided at an input of the encoding means ENC, following a predefined encoding algorithm and to generate thereby an encoded software package PACK.ENC and to provide the encoded software package PACK.ENC to an output of the provider station. The encoding of the readable version of the software package PACK.SOURCE i.e. a LISP code package is realized by encoding separately each top-level expression of the LISP code package, called hereafter a separate part. The detailed cryptosystem used during the encoding of each separate part of the LISP code package goes beyond the scope of this invention and will not be described. The aim is the fact that the software package is encoded. However, two cryptographycal techniques included in the cryptosystem and used in this preferred embodiment are shortly mentioned hereafter: i.e. the Caesar Cipher whereby each letter of a separate part is replaced by a new letter obtained by an alphabetic shift and a permutation whereby the positions of the letters of a separate part are rearranged.

The generating means GEN are included in the provider station PS to generate a basis software package BASIS and to provide the basis software package BASIS to an output of the provider station PS in order to deliver the basis software package BASIS to the user station US. The basis software package BASIS is a software package which, for this preferred embodiment, has been delivered separately and in advance by the provider station PS to the user station US. This completed delivery of the basis software package BASIS is shown in the FIGURE with a dotted line, which can also be indicative of the same physical medium used to deliver the encoded software package PACK.ENC. Of course, other methods of delivery can easily be effected, as suggested previously. The basis software package BASIS is generated and delivered to the user station US in order to provide the user station US the ability to perform a combined decoding and compiling of an encoded software package PACK.ENC. In order to perform the decoding part of the combined decoding and compiling, software to perform a decoding algorithm following the predefined encoding algorithm is included in the basis software package BASIS. In order to perform the compiling part of the combined decoding and compiling, software to get access to the compiler which is installed at the user station US is included in the basis software package BASIS. The further principle working of the step of combined decoding and compiling will be explained later on.

Although other platforms are of course useable, the preferred hardware and software platform of the user station US is a SUN Microsystems workstation with the SunOS operating system. The user station US includes receiving means REC and combined decoding and compiling means DEC/COMP.

The receiving means REC are included in order to receive an encoded software package PACK.ENC from the provider station PS. In the event when the software package will be used, the encoded software package PACK.ENC is provided to the combined decoding and compiling means DEC/COMP. The combined decoding and compiling means DEC/COMP are included to perform combined decoding and compiling of the encoded software package PACK.ENC. As already mentioned above, in order to perform this combined operation, a basis software package BASIS has to be installed at the user station US. Since this basis software package BASIS provides access to the compiler, it is evident to a person skilled in the art that a compiler (not shown in the FIGURE) has to be installed at the user station US. The installed compiler at the user station US is a compiler which is able to perform a translation of programs written in LISP into machine language instructions which are understandable to the SUN Microsystem workstation. While executing the combined step of decoding and compiling the combined decoder and compiling means DEC/COMP generates a compiled software package PACK.COMP.

The principle working of the preferred embodiment regarding the invention thus includes the following different steps:
  encoding of a readable source version of the software package PACK.SOURCE following a predefined encoding algorithm in the provider's station PS whereby an encoded software package PACK.ENC is generated: first each separate part of the readable source version of the software package PACK.SOURCE is encoded separately and further on, a lexical environment which defines the scope of a predefined key variable, is constructed. This lexical environment consists of macros which have an encoded separate part as argument and which forms the encoded software package PACK.ENC;
  delivering of the encoded software package PACK.ENC to the receiving means REC of the user station US;
  providing the encoded software package PACK.ENC from the receiving means REC to the combined decoding and compiling means DEC/COMP;
  combined decoding and compiling of the encoded software package PACK.ENC by using the already available basis software package BASIS whereby a compiled software package is generated PACK.COMP: each macro is expanded at compilation time and calls the decoding algorithms i.e. encoded top-level expressions are decrypted during compilation; in order for each macro to expand to the original top-level expression the predefined key is required and checked; in the event when the predefined key is not there or is wrong the execution is stopped. The presence of the required key means also that should the compiling action be interrupted, the predefined key is then withdrawn and the decoding fails. In this way, the output of the decoding step can not be intercepted by a user of the user station and the decoded code is passed seamlessly to the compiler.

It has to be remarked that although in the described embodiment the chosen programming language is the LISP programming language, it is evident to a person skilled in the art that the method following the invention is not restricted to the LISP programming languages and that the method of the invention can be used for any existing programming language. However some programming languages are more suited than other programming languages to provide the combined step of decoding and compiling in a seamless way.

Still a remark is that providing a software package following the method of the invention is, as already discussed above, delivering of a software package which is platform independent. A much published method of providing a software package to a user is the Java programming language environment, for short i.e. Java from Sun Microsystems. Java works following the following method: a virtual machine emulating a Java processor which is dedicated to a particular hardware and software platform is installed on the user station whereby this particular hardware and software of the user station is shielded; in this way Java compiled code is delivered from the provider station to any user station which has a Java virtual machine installed whereby the Java compiled coded is platform independent. For both methods, the method of the invention and the method of Java, the provided software packages are platform independent software packages. However Java does not omit the step of compiling at the provider's station which the invention does. Also, Java does not enjoy the advantage of saving transmission volume of the delivered software package since this delivered software package is still a compiled version of a readable source version instead of an encoded version of a readable source version. Moreover, the encoded software package delivered following the method of the invention is directly used on the hardware and software platform of the user station which is not the case with the Java method which is using the delivered compiled code with the intervention of a virtual machine. Finally, since the method following the invention can be implemented for any existing programming language the invention profits from the effort invested in the development of e.g. compilers and debuggers and from the effort invested in encryption and decryption models and does not require the construction of a virtual machine for each target hardware and software platform.

While the principles of the invention have been described above in connection with specific apparatus, it is to be clearly understood that this description is made only by way of example and not as a limitation on the scope of the invention.

What is claimed is:

1. Method to provide a software package for installation in a user station (US) without revealing the contents of said software package, characterized in that said method includes the steps of:
  encoding a readable source version (PACK.SOURCE) of said software package following a predefined encoding algorithm for generating an encoded software package (PACK.ENC); and
  delivering said encoded software package (PACK.ENC) to said user station (US),
  characterized in that said method additionally includes the step of providing, either together with said encoded software package (PACK.ENC) or separately, a basis software package (BASIS) for combined decoding and compiling said encoded software package (PACK.ENC) at said user station, said basis software package (BASIS) including software to perform said combined decoding and compiling within a combined step at said user station for generating a compiled software package (PACK.COMP) so that generating the readable source version of said software package at said user station is prevented.

2. A method according to claim 1, characterized in that said combined decoding and compiling includes separately combined decoding and compiling of separate parts of said encoded software package (PACK.ENC).

3. A method according to claim 1, characterized in that said method additionally includes the step of providing a basis software package (BASIS) for combined decoding and compiling said encoded software package (PACK.ENC), said basis software package (BASIS) including software to perform combined decoding and compiling of said encoded software package (PACK.ENC) following an interpreted mode.

4. A method according to claim 3, characterized in that said combined decoding and compiling includes separately combined decoding and compiling of separate parts of said encoded software package (PACK.ENC).

5. Provider station (PS) to provide a software package to a user station (US) for installation without revealing the contents of said software package, characterized in that said provider station (PS) includes encoding means (ENC) to encode a readable source version (PACK.SOURCE) of said software package following a predefined encoding algorithm in order to generate thereby an encoded software package (PACK.ENC) and to provide said encoded software package (PACK.ENC) to an output of said provider station (PS) in order to deliver said encoded software package (PACK.ENC) from said provider station (PS) to said user station (US), characterized in that said provider station (PS) further includes generating means (GEN) to generate a basis software package (BASIS) and to provide said basis software package (BASIS) to an output of said provider station (PS) in order to deliver said basis software package (BASIS) to said user station (US), said basis software package (BASIS) including software to perform at said user station combined decoding and compiling within a combined step of said encoded software package (PACK.ENC) and to generate a compiled software package (PACK.COMP) so that generating the readable source version of said software package at said user station is prevented.

6. A user station (US) to install a software package, delivered to said user station (US) as an encoded software package (PACK.ENC), originated in a provider station (PS) and encoded to avoid revealing the contents of said software package, characterized in that said user station (US) includes receiving means (REC) to receive said encoded software package (PACK.ENC) and combined decoding and compiling means (DEC/COMP) to perform combined decoding and compiling within a combined step of said encoded software package (PACK.ENC) at said user station and to generate a compiled software package (PACK.COMP) so that generating a readable source version of said software package is prevented, said combined decoding and compiling being performed following software included in a basis software package (BASIS) either delivered by said provider station (PS) to said user station (US) together with said encoded software package (PACK.ENC) or separately.

7. Basis software package (BASIS) characterized in that said basis software package (BASIS) includes software to perform combined decoding and compiling within a combined step of an encoded software package (PACK.ENC) at a user station which is generated while encoding a readable source version of a software package (PACK.SOURCE) following a predefined encoding algorithm so that a compiled software package is generated without for installation and generating a readable source version of the software package in the user station is prevented.

8. A basis software package (BASIS) according to claim 7, characterized in that said basis software package (BASIS) includes one or more security conditions included in order to be controlled while using said basis software package (BASIS) and whereby upon checking of one of said one or more security conditions and in the event that said one security condition is not fulfilled said combined decoding and compiling is not further executed or said encoded software package is destroyed.

9. A basis software package (BASIS) according to claim 7, characterized in that said basis software package (BASIS) includes a pay per use scheme included in order to keep track of the number of times said basis software package (BASIS) is used.

* * * * *

UNITED STATES PATENT AND TRADEMARK OFFICE
CERTIFICATE OF CORRECTION

PATENT NO : 6,063,134
DATED : May 16, 2000
INVENTOR(S): L. Peters et al

It is certified that error appears in the above-identified patent and that said Letters Patent are hereby corrected as shown below:

On the Title Page

At INID [56], line 6, please cancel "5/1999" and substitute --2/1999-- therefor.

Signed and Sealed this

Seventeenth Day of April, 2001

Attest:

NICHOLAS P. GODICI

Attesting Officer

Acting Director of the United States Patent and Trademark Office